United States Patent
Masuda

(10) Patent No.: US 6,879,438 B2
(45) Date of Patent: Apr. 12, 2005

(54) INFRARED FILTER

(75) Inventor: Narihiro Masuda, Sakata-gun (JP)

(73) Assignee: Mitsubishi Polyester Film Corporation, Tokyo (JP)

( * ) Notice: Subject to any disclaimer, the term of this patent is extended or adjusted under 35 U.S.C. 154(b) by 0 days.

(21) Appl. No.: 10/101,794

(22) Filed: Mar. 20, 2002

(65) Prior Publication Data

US 2003/0016442 A1 Jan. 23, 2003

(30) Foreign Application Priority Data

Mar. 27, 2001 (JP) ......................................... 2001-089308

(51) Int. Cl.$^7$ ................................................. G02B 5/20
(52) U.S. Cl. ....................................... 359/359; 359/350
(58) Field of Search ................................ 359/350, 359, 359/885; 252/582, 587

(56) References Cited

U.S. PATENT DOCUMENTS

| | | | | |
|---|---|---|---|---|
| 5,691,838 A | * | 11/1997 | Shouji et al. ................ | 359/359 |
| 6,049,419 A | * | 4/2000 | Wheatley et al. ............ | 359/359 |
| 6,104,530 A | * | 8/2000 | Okamura et al. ............ | 359/359 |
| 6,162,527 A | | 12/2000 | Ogawa et al. ............... | 428/141 |
| 6,423,396 B2 | * | 7/2002 | Hashimoto .................. | 428/141 |
| 6,542,292 B2 | * | 4/2003 | Onomichi et al. ........... | 359/350 |

FOREIGN PATENT DOCUMENTS

| | | | |
|---|---|---|---|
| EP | 0 551 905 A1 | 7/1993 | ........... G11B/5/704 |
| EP | 0 782 164 A1 | 7/1997 | ............. H01J/5/16 |
| EP | 0 810 452 A2 | 12/1997 | ............. G02B/5/20 |
| EP | 1 001 282 A2 | 5/2000 | ............. G02B/5/22 |
| JP | 10078509 | 3/1998 | ............. G02B/5/22 |
| JP | 11-305033 | 5/1999 | |
| JP | 11-095026 | 9/1999 | |
| JP | 11-326629 | 11/1999 | |
| JP | 11-326630 | 11/1999 | |
| JP | 2000-121828 | 4/2000 | |

* cited by examiner

Primary Examiner—Drew A. Dunn
Assistant Examiner—Joshua L Pritchett
(74) Attorney, Agent, or Firm—Edwards & Angell, LLP; David G. Conlin; John J. Penny, Jr.

(57) ABSTRACT

The present invention relates to an infrared filter comprising a biaxially oriented co-extruded film having at least three polyester layers comprising an intermediate polyester layer and the surface polyester layers on both sides of the said intermediate layer, said intermediate layer containing a near infrared absorber having an absorption peak at 800 to 1,100 nm in an amount of 0.1 to 10% by weight based on the weight of the intermediate layer, the light transmittance of said film being not higher than 30% at 950 nm, and the average center line roughness (Ra) of the film surface on at least one side being 10 to 30 nm.

16 Claims, No Drawings

INFRARED FILTER

BACKGROUND OF THE INVENTION

The present invention relates to an infrared filter. More particularly, it relates to an optical filter using a polyester film, especially, an optical filter having excellent transparency and workability and capable of intercepting the near infrared rays.

With start of BS digital high-vision broadcasting and spread of DVD players, request is rising for higher quality of display images. As a high quality display system that would supersede the presently prevailing CRT display, plasma display panel (hereinafter abbreviated as PDP) has begun to hit the market, partially to be used for public welfare, and is focusing the spotlight of attention.

PDP is of a system in which ultraviolet rays are radiated by electrical discharges in an inactive gas such as neon or xenon gas, and they are hit against a phosphor and converted into visible rays of RGB to cause luminescence. It is known, however, that such electrical discharges in an inert gas generate not only ultraviolet rays but also electromagnetic waves of various wavelengths which include light of a wavelength in the near infrared region which is often used for remote controls. If the light rays emitted from PDP are left as they are, they will cause wrong operation of remote controls to exert influence on the various remote-controlled devices such as household electrical appliances.

To the above problem, it has been proposed to mount an infrared filter, which can intercept the near infrared rays, on the front side of PDP. This infrared filter is generally manufactured by coating the surface of a highly transparent plastic film with a material comprising an infrared absorber, a polymer binder and other additives dissolved or dispersed in an organic solvent, and removing the solvent by drying (Japanese Patent Application Laid-Open (KOKAI) Nos. 11-95026, 11-305033, 11-326629, 11-326630, 2000-121828, etc.)

The infrared filters produced in the above references, however, have such disadvantages that since the surface of the infrared absorber-incorporated coating layer is highly flat for maintaining transparency, it is very difficult to wind up the film after coating and drying.

SUMMARY OF THE INVENTION

An object of the present invention is to provide an infrared filter having high transparency and excellent winding workability and capable of effectively intercepting light of wavelengths in the near infrared region.

As a result of the present inventor's earnest study to solve the above problem, it has been found that the above problem can be solved by a laminated polyester film having an intermediate layer containing a prescribed amount of a near infrared absorber, and also having a specific light transmittance and a specific surface roughness.

The present invention has been attained on the basis of the above finding.

Thus, in an aspect of the present invention, there is provided an infrared filter comprising an infrared filter comprising a biaxially oriented co-extruded film having at least three polyester layers comprising an intermediate polyester layer and the surface polyester layers on both sides of the said intermediate layer, said intermediate layer containing a near infrared absorber having an absorption peak at 800 to 1,100 nm in an amount of 0.1 to 10% by weight based on the weight of the intermediate layer, the light transmittance of said film being not more than 30% at 950 nm, and the average center line roughness (Ra) of the film surface on at least one side being 10 to 30 nm.

DETAILED DESCRIPTION OF THE INVENTION

The present invention will be described in further detail below.

The infrared filter according to the present invention comprises a laminated film having at least three polyester layers laminated one over another. If the polyester film has a single-layer structure, there tends to take place such undesirable phenomena as bleed-out of the incorporated near infrared absorber or dye and sublimation thereof, which contaminates the film forming machine to make it unable to continue the production itself in many cases.

Further, the said laminated film is a film produced by the so-called co-extrusion method in which all of the layers are melt extruded from the diehead of an extruder, and by biaxially oriented in two axial directions—machine direction and transverse direction, so-called biaxially oriented polyester film. Such a laminated film has the surface layers on both sides and an intermediate layer therebetween, and the intermediate layer itself may have a laminated structure.

The polyester used for the respective layers is the one obtained by polycondensing an aromatic dicarboxylic acid and an aliphatic glycol. As the aromatic dicarboxyilc acid, terephthalic acid, 2,6-naphthalenedicarboxylic acid and the like can be used. As the aliphatic glycol, ethylene glycol, diethylene glycol, 1,4-cyclohexanedimethanol and the like can be used. Typical examples of the polyesters usable in the present invention are polyethylene terephthalate (PET) and polyethylene-2,6-naphthalene dicarboxylate (PEN), especially, PET being preferred because of a good balance of properties and cost.

The polyester used in the present invention may be a copolymer containing a third component(s) as far as the total amount thereof is not more than 20% by mole, preferably not more than 10% by mole. The dicarboxylic acid moiety of the copolymer polyester comprises one or more of isophthalic acid, phthalic acid, terephthalic acid, 2,6-naphthalenedicarboxylic acid, adipic acid, sebacic acid, oxycarboxylic acid (such as p-oxybenzoic acid) and the like, and the glycol moiety comprises one or more of ethylene glycol, diethylene glycol, propylene glycol, butanediol, 1,4-cyclohexanedimethanol, neopentyl glycol and the like.

The intermediate layer contains a near infrared absorber having an absorption peak at 800 to 1,100 nm in an amount of 0.1 to 10% by weight, preferably 0.5 to 5% by weight based on the weight of the intermediate layer. The near infrared absorber is preferably the one which is substantially dissolved and uniformly mixed with the molten-state polyester and is scarcely pyrolyzed at the polyester molding temperature. Examples of such near infrared absorbers are imonium-based compounds, diimonium-based compounds, phthalocyanine compounds, aminium compounds and polymethine compounds. A preferred example of commercially available near infrared absorber for use in the present invention is IR-ADDITIVE 200 (trade name) produced by Dainippon Ink and Chemicals, Inc.

The concentration of the near infrared absorber present in the intermediate layer may be set arbitrarily within the above-defined range depending on the thickness of the intermediate layer, but it is set so that light transmittance of the laminated film at 950 nm become not more than 30%, preferably not more than 25%, in view of the relation between the intermediate layer thickness and the near infrared absorber concentration. If light transmittance of the film at 950 nm exceeds 30%, remote controls of various household electrical appliances may be caused to operate wrongly by the near infrared component in the electromagnetic waves emitted from PDP.

If the content of the infrared absorber in the intermediate layer is less than 0.1% by weight, the intermediate layer thickness may become so large as to exceed the range of film thickness obtainable with an ordinary biaxially oriented polyester. On the other hand, if the content of the infrared absorber exceeds 10% by weight, it may become hard for the infrared absorber to dissolve in the polyester, with the result that the agglomerates and/or insoluble portion of the infrared absorber tend to form and remain in the film, deteriorating the film transparency or producing other undesirable effects such as giving an impression as if an alien substance exists in the film.

In order to secure specific surface slipperiness and winding workability, the infrared filter of the present invention needs to meet the requirement that the average center line roughness (Ra) of the film surface on at least one side thereof is 10 to 30 nm, preferably 15 to 25 nm. It is more preferable that both sides of the film surface meet the above requirement. If the average center line roughness is less than 10 nm, there may not be obtained the desired surface slipperiness of the film, and if it exceeds 30 nm, film haze may become intolerably high.

For obtaining the said average center line roughness of the film surface, it is preferable to contain the fine particles of a size and an amount necessary to form the fine projections in the surface layers of the biaxially oriented polyester film. As such fine particles, there can be used the particles of one or more of the substances selected from silicon oxide, calcium carbonate, kaolin, crosslinked organic polymers and the like. The average size of these fine particles is usually 0.1 to 3.0 $\mu$m, preferably 0.2 to 2.0 $\mu$m, and their amount added is usually 0.001 to 0.3% by weight, preferably 0.01 to 0.2% by weight based on the weight of the surface layer. These parameters may be properly selected from within the above-defined ranges so that the said average center line roughness may be provided. By confining the average center line roughness within the above-defined range, it is possible to minimize the rise of film haze and to secure the necessary slipperiness of the film.

In the polyester constituting the film surface layers, it is possible to incorporate an additive or additives such as ultraviolet absorber, antioxidant and antistatic agent.

The thickness of each surface layer containing the said fine particles is usually 0.5 to 5.0 $\mu$m, preferably 0.5 to 3.0 $\mu$m, irrespective of the overall film thickness. The two surface layers may be the same or different in thickness. It is to be noted that a too thin surface layer may cause bleed-out of the near infrared absorber and/or the dye present in the intermediate layer, while a too thick surface layer may invite a rise of haze of the whole film.

The biaxially oriented polyester film used for the infrared filter of the present invention not only performs its normal function as an infrared filter but also can be tinted even in the visible light region (380–780 nm) for improving the PDP image contrast. When the visible light transmittance of the film is usually 50 to 80%, preferably 55 to 75%, there is no fear that the image would become too dark while producing the said effect of improving image contrast.

For the above purpose, the biaxially oriented polyester film used as the infrared filter of the present invention can be tinted by adding to the said intermediate layer a dye having absorption in the visible light region (380–780 nm) in addition to the said near infrared absorber. The dye used in this case is preferably the one which can be substantially dissolved and uniformly mixed in the molten-state polyester and is also scarcely decomposed at the polyester molding temperature. As such a dye, anthraquinone type, perinone type, perillene type, azomethine type and heterocyclic dyes are preferably used from the aspect of chemical structure, and oil-soluble dyes are preferred from the aspect of formulation. Also, by adding such a dye, it is preferable to adjust the color to a gray tone so as not to change the color tone of the PDP image. Usually, several types of these dyes are properly selected and used as an admixture. The total content of the dyes in the intermediate layer of the polyester film is usually 0.01 to 5% by weight, preferably 0.05 to 3% by weight based on the weight of the intermediate layer.

It is particularly preferable that the biaxially oriented polyester film used as the infrared filter of the present invention has high transparency with little cloudiness so that the PDP image can be seen clearly without dimness. Low film haze is preferable for keeping good transparency of the film. Usually, good transparency is ensured when film haze is lower than 3.0%, preferably lower than 2.5%, more preferably lower than 2.0%. When film haze exceeds 3.0%, cloudiness of the film tends to become conspicuous to impair transparency.

Regarding the method of incorporating the said near infrared absorber and dye in the polyester, it is possible to add them in the form of a powder, paste or liquid when melt molding the film, but in view of the problem of contamination of the apparatus and ease of change of formulation, it is preferable to first prepare a masterbatch of the infrared absorber and dye and incorporate such a masterbatch while diluting it with a clear resin in the course of melt molding of the film. Also, in such melt molding, a double-screw extruder is preferably used for effecting kneading with good dispersion in the polyester.

Next, a process for producing a biaxially oriented polyester film to be used for the infrared filter of the present invention is described in detail. It is to be understood, however, that the film of the present invention is not limited in any way by the following exemplary process.

Using the above-mentioned polyester materials, plural sets of extruder and a multi-manifold die or feed block, the respective polyester materials in lamination were extruded into a multi-layer molten sheet from the diehead, and the extrudate was cooled and solidified by the cooling rolls to obtain a non-stretched sheet. In this operation, in order to improve flatness of the sheet, it is preferable to enhance adhesion between the sheet and the rotary cooling drum, for which an electrostatic pinning method and/or a liquid coat adhesion method is preferably used.

The obtained non-stretched film is then stretched in two axial directions to effect biaxial orientation. More specifically, the said non-stretched sheet is first stretched usually 2.5 to 7 times, preferably 3.0 to 6 times in the machine direction by a roll stretcher at a temperature of usually 70 to 120° C., preferably 80 to 110° C., and then stretched usually 3.0 to 7 times, preferably 3.5 to 6 times in the transverse direction at usually 70 to 120° C., preferably 80 to 115° C. The stretched film is then heat treated at 170 to 250° C. under tension or relaxation of not more than 30% to obtain a biaxially oriented film.

In carrying out above stretching, it is possible to use a method in which stretching in one direction is conducted in two or more stages. In this case, the stretching operation is preferably adjusted so that there will be finally provided the above-defined stretch ratios in the two directions. It is also possible to conduct biaxial stretching simultaneously so that the sheet will be multiplied 10 to 40 times in area. Further, if necessary, the above film may be re-stretched in the machine and/or transverse direction before or after a heat treatment.

The thus obtained film may be subjected to surface coating, if necessary. Such surface coating is performed, for instance, for the purpose of strengthening adhesion or affording such quality as antistatic properties or ease of adhesion, and it can be accomplished by a series of steps in the above-described film forming process in which at the stage where longitudinal stretching has been completed, a coating solution using mainly water as medium is applied to one side or both sides of the film (in-line coating), and the coated film is dried, preheated and stretched transversely in a tenter and then heat set. The coating solution used here preferably contains a polymer such as a polyester, a poly (meth)acrylate, a polyurethane or a polyolefin which has been made soluble or dispersible in water.

The biaxially oriented polyester film used as the infrared filter of the present invention is attached to a front glass substrate of PDP, etc., and such attachment can be effected by applying a known adhesive agent between the film and the glass substrate. In applying such an adhesive agent, a known plastic film subjected to a known release treatment may be used as "separator film".

Further, on the side opposite from attachment to a glass substrate, a known hard coat may be provided for the purpose of preventing scratches, etc. For such a hard coat, a thermosetting or UV-curable acrylic resin having both transparency and scuff resistance can be used.

This hard coat surface may be provided with an antireflection film for reducing reflection of sunlight or illumination. Such an antireflection film may be formed by using vacuum thin film forming techniques, e.g., depositing or sputtering of a metal oxide such as $TiO_2$, $ZrO_2$, ITO, $SiO_2$, $MgF_2$, $SnO_2$ or $NiO_2$, or by dispersing a metal oxide such as mentioned above in an organic binder and coating it on the hard coat surface.

According to the present invention, as described above, there is provided a biaxially oriented polyester film having ordinary winding workability, which can be used as an infrared filter suited for application to plasma display panels for the purpose of intercepting the near infrared rays which are causative of misled operation of remote controls. Also, by tinting the film into a gray tone, it is possible to improve the PDP image contrast. Further, the polyester film of the present invention can be produced by using an ordinary film forming machine with no likelihood of contaminating the film forming machine with the near infrared absorber and other materials used, so that the present invention is of high industrial value.

EXAMPLES

The present invention will be described in further detail with reference to the embodiments thereof, but it is to be understood that these embodiments are merely intended to be illustrative and not to be construed as limiting the scope of the invention. In the following Examples and Comparative Examples, all "parts" are by weight unless otherwise noted.

The following methods were used for the determinations in the present invention.
(1) Absorption Peak of Near Infrared Absorber and its Light Transmittance at 950 nm.

Determinations were made by using a spectrophotometer UV-3100PC (mfd. by Shimadzu Corp.). The component materials of a near infrared absorber were dissolved in a suitable solvent or added to PET to make a film, and the wavelength of its absorption peak and light transmittance at 950 nm were measured.
(2) Visible Light Transmittance Light transmittance at each wavelength was measured by a spectrophotometer UV-3100PC (Shimadzu Corp.), and visible light transmittance was calculated according to JIS S 3107.
(3) Average Center Line Roughness (Ra) of the Film Average center line roughness was determined in the following way by using a surface roughness tester (SE-3F) mfd. by Kosaka Laboratory Co., Ltd. A portion of the standard length (2.5 cm) was cut out from the film in the direction of its center line from the sectional curve. With the center line of the cut out portion being represented by X axis and the longitudinal stretch ratio by Y axis, the roughness curve was expressed as Y=f(X), and the value given by the following equation was indicated in unit of $\mu$m.

$$Ra = (1/L)\int_0^L |f(X)|dX$$

10 sectional curves were selected from the specimen film surface, and the mean value of center line roughness of the cut out portion determined from the above sectional curves was calculated and indicated as average center line roughness. Determinations were made under the following conditions: feeler end radius=2 $\mu$m; load=30 mg; cut-off=0.08 mm.
(4) Film Haze Film haze was measured according to JIS K 7105 using a hazeometer NDH300A (mfd. by Nippon Denshoku KK).

The polyester materials used in the following Examples and Comparative Examples were produced in the following way.
<Polyester A>

100 parts of dimethyl phthalate, 60 parts of ethylene glycol and 0.09 part of magnesium acetate tetrahydrate were heated in a reactor while evaporating away methanol to carry out ester exchange reaction. The temperature was raised to 230° C. over a period of 4 hours after start of the reaction to substantially complete the ester exchange reaction. Then 0.04 part of ethyl acid phosphate and 0.04 part of antimony trioxide were added, with the temperature being raised to 280° C. and the pressure was reduced to 15 mmHg in 100 minutes. Pressure was further reduced gradually thereafter until finally reaching 0.3 mmHg. 4 hours later, the system was returned to normal pressure, thus obtaining polyester A which was substantially free of fine particles.
<Polyester B>

100 parts of dimethyl terephthalate, 60 parts of ethylene glycol and 0.09 part of magnesium acetate tetrahydrate were heated in a reactor while evaporating away methanol to carry out ester exchange reaction. The temperature reached 230° C. in 4 hours after start of the reaction, and at this point the ester exchange reaction was substantially completed. Then an ethylene glycol slurry containing silica particles having an average size of 1.6 $\mu$m was added to the reaction system, after which 0.04 parts of ethyl acid phosphate and 0.04 part of antimony trioxide were further added, with the temperature being raised to 280° C. and the pressure was reduced to 15 mmHg in 100 minutes. Pressure was kept lowering gradually thereafter, finally reaching 0.3 mmHg. 4 hours later, normal pressure was restored in the system, obtaining polyester B. The silica particle content of the obtained polyester B was 0.6% by weight.

<Polyester C>

Polyester A was supplied to a vented double-screw extruder, and then a near infrared absorber IR-ADDITIVE 200 (produced by Dainippon Ink and Chemicals Co., Ltd.; having an absorption peak at 870 nm) was added thereto to a concentration of 5% by weight, and the mixture was melt kneaded and chipped to make a near infrared absorber masterbatch polyester C.

<Polyester D>

Polyester A was supplied to a vented double-screw extruder, and then Diaresin Red HS, Diaresin Blue H3G and Diaresin Yellow F (all produced by Mitsubishi Chemical Corporation) were added to the concentrations of 6.0% by weight, 2.5% by weight and 1.5% by weight, respectively, and the mixture was melt kneaded and chipped to make a dye masterbatch polyester D.

Example 1

A 80:20 blend of polyester A chips and polyester C chips was supplied as an intermediate layer forming resin to an intermediate layer forming extruder. Separately from this, an 83:17 blend of polyester A chips and polyester B chips was supplied as a surface layer forming resin to a surface layer forming extruder. Each of the extruders was a vented opposite-direction double-screw extruder. The resins were extruded at a molten temperature of 290° C. without being dried, and the molten polymers were joined and laminated in the feed block. The extrudate was cooled and solidified on the cooling rolls set at a surface temperature of 40° C. by using the electrostatic pinning method to obtain a laminated non-stretched sheet of a three-layer structure. This sheet was stretched 3.5 times in the machine direction at 85° C. and then led into a tenter where the film was further stretched 4.0 times in the transverse direction at 105° C., after which the film was heat set at 220° C. and relaxed 5% in the width direction at 200° C. to obtain a biaxially oriented film. The layer thickness profile of this film was 2/21/2 μm the overall thickness being 25 μm. This film could be wound up free of problem.

The properties of this film are shown in Table 1. When this film was set on a frontal glass substrate of PDP, radiation of near infrared rays was reduced owing to low light transmittance at 950 nm. When it was tried to operate a remote-control system via this film in another test, the remote-control system remained inoperative.

Example 2

The same procedure as defined in Example 1 was conducted except for use of a 77:20:3 blend of polyesters A, C and D as the intermediate layer resin to make a biaxially oriented film. The thickness profile of this three-layer film was 2/21/2 μm, the overall thickness being 25 μm. This film could be wound up without a hitch.

The properties of this film are shown in Table 1. When this film, tinted to a gray tone, was set on a frontal glass substrate of PDP, the PDP image contrast became clearer. Also, radiation of the near infrared rays was reduced owing to low light transmittance at 950 nm. When it was tried to operate a remote control system via this film in another test, the remote control system remained inoperative.

Example 3

The procedure of Example 2 was carried out but by using a 70:20:4 blend of the chips of polyesters A, C and D as the intermediate layer resin to make a biaxially oriented film. The thickness profile of this three-layer film was 2/21/2 μm, the overall thickness being 25 μm. This film could be wound up free of problem.

The properties of this film are shown in Table 1. When this film was set on the frontal glass substrate of PDP, radiation of infrared rays was reduced because of low light transmittance at 950 nm. Also, when it was tried to operate a remote control system via this film in another test, the remote control system remained inoperative. However, because of low visible light transmittance of this film, PDP images were rather dark.

Comparative Example 1

The same procedure as defined in Example 1 was conducted except for use of a 95:5 blend of polyesters A and B as the surface layer resin to make a biaxially oriented film. The thickness profile of this three-layer film was 2/21/2 μm, the overall thickness being 25 μm.

The properties of this film are shown in Table 1. When this film was set on a frontal glass substrate of PDP, radiation of infrared rays was reduced owning to low light transmittance at 950 nm. When it was tried to operate a remote control system via this film in another test, the remote control system remained inoperative. However, when two pieces of this film were attached to each other and forced to move in the opposite directions, they scarcely slipped relative to each other. Also, when the film was wound up in the film forming process, the film was crumpled or scratched heavily. Thus, winding workability of this film was very bad.

Comparative Example 2

The same procedure as defined in Example 1 was carried out except for use of a 85:15 blend of polyesters A and C as the intermediate layer resin to make a biaxially oriented film. The thickness profile of this three-layer film was 2/21/2 μm, the overall thickness being 25 μm. This film could be wound up with no problem.

The properties of this film are shown in Table 1. Light transmittance of this film at 950 nm was over 30%. When it was set on a frontal glass substrate of PDP, a reduction of radiation of near infrared rays could be confirmed, but when it was tried to operate a remote control system via this film in another test, the remote control system operated wrongly in part.

TABLE 1

|  | Example 1 | Example 2 | Example 3 | Comp. Example 1 | Comp. Example 2 |
|---|---|---|---|---|---|
| Near infrared absorber concentration in intermediate layer (%) | 1.0 | 1.0 | 1.0 | 1.0 | 0.75 |
| Light transmittance at 950 nm (%) | 29 | 29 | 29 | 29 | 39 |
| Average center line roughness (Ra) | 22 nm | 22 nm | 22 nm | 6 nm | 22 nm |
| Film winding workability | good | good | good | bad | good |
| Visible light transmittance (%) | 70 | 55 | 44 | 70 | 72 |
| Film haze (%) | 2.0 | 2.2 | 2.4 | 1.2 | 1.8 |

TABLE 1-continued

| | Example 1 | Example 2 | Example 3 | Comp. Example 1 | Comp. Example 2 |
|---|---|---|---|---|---|
| Wrong operation of remote control system | No | No | No | No | Occurred in part |

What is claimed is:

1. An infrared filter comprising a biaxially oriented co-extruded film consisting of an intermediate polyester layer and surface polyester layers having a thickness of 0.5 to 5.0 μm on both sides of the said intermediate layer, said intermediate layer containing a near infrared absorber having an absorption peak at 800 to 1,100 nm in an amount of 0.1 to 10% by weight based on the weight of the intermediate layer, the light transmittance of said film being not more than 30% at 950 nm, and the average center line roughness (Ra) of at least one side of the film surface being 10 to 30 nm.

2. An infrared filter according to claim 1, wherein the near infrared absorber is an imonium-based compound, a diimonium-based compound, a phthalocyanine compound, an aminium compound or a polymethine compound.

3. An infrared filter according to claim 1, wherein the intermediate layer contains a dye or dyes, and a visible light transmittance of the film at 380 to 780 nm is 50 to 80%.

4. An infrared filter according to claim 3, wherein the total content of the dye(s) is 0.01 to 5% by weight based on the weight of the intermediate layer.

5. An infrared filter according to claim 1, wherein the film haze is not more than 3.0%.

6. An infrared filter according to claim 1, wherein the surface layers contain fine particles.

7. An infrared filter according to claim 6, wherein the average size of the fine particles is 0.1 to 3.0 μm, and the content thereof is 0.001 to 0.3% by weight based on the weight of the surface layer.

8. An infrared filter according to claim 1, which is used for plasma displays.

9. An infrared filter comprising a biaxially oriented co-extruded film having at least three polyester layers comprising an intermediate polyester layer and surface polyester layers having a thickness of 0.5 to 5.0 μm on both sides of the said intermediate layer, said intermediate layer containing a near infrared absorber having an absorption peak at 800 to 1,100 nm in an amount of 0.1 to 10% by weight based on the weight of the intermediate layer, the light transmittance of said film being not more than 30% at 950 nm, and the average center line roughness (Ra) of the film surface on at least one side being 15 to 30 nm.

10. An infrared filter according to claim 9, wherein the near infrared absorber is an imonium-based compound, a diimonium-based compound, a phthalocyanine compound, an aminium compound or a polymethine compound.

11. An infrared filter according to claim 9, wherein the intermediate layer contains a dye or dyes, and a visible light transmittance of the film at 380 to 780 nm is 50 to 80%.

12. An infrared filter according to claim 11, wherein the total content of the dye(s) is 0.01 to 5% by weight based on the weight of the intermediate layer.

13. An infrared filter according to claim 9, wherein the film haze is not more than 3.0%.

14. An infrared filter according to claim 9, wherein the surface layers contain fine particles.

15. An infrared filter according to claim 14, wherein the average size of the fine particles is 0.1 to 3.0 μm, and the content thereof is 0.001 to 0.3% by weight based on the weight of the surface layer.

16. An infrared filter according to claim 9, which is used for plasma displays.

* * * * *